United States Patent
Yuan et al.

(10) Patent No.: US 7,817,640 B2
(45) Date of Patent: Oct. 19, 2010

(54) FAIR ROUND ROBIN SCHEDULER FOR NETWORK SYSTEMS

(75) Inventors: Xin Yuan, Tallahassee, FL (US); Zhenhai Duan, Tallahassee, FL (US)

(73) Assignee: Florida State University, Tallahassee, FL (US)

(*) Notice: Subject to any disclaimer, the term of this patent is extended or adjusted under 35 U.S.C. 154(b) by 1017 days.

(21) Appl. No.: 11/027,283

(22) Filed: Dec. 31, 2004

(65) Prior Publication Data

US 2005/0243848 A1 Nov. 3, 2005

Related U.S. Application Data

(60) Provisional application No. 60/533,492, filed on Dec. 31, 2003.

(51) Int. Cl.
*H04L 12/56* (2006.01)
(52) U.S. Cl. .................... 370/395.2; 370/392
(58) Field of Classification Search ............. None
See application file for complete search history.

(56) References Cited

U.S. PATENT DOCUMENTS

| | | | | |
|---|---|---|---|---|
| 5,029,183 | A * | 7/1991 | Tymes | 375/141 |
| 6,118,784 | A * | 9/2000 | Tsuchiya et al. | 370/401 |
| 6,216,164 | B1 | 4/2001 | Zaremba | |
| 6,469,982 | B1 * | 10/2002 | Henrion et al. | 370/230 |
| 7,277,446 | B1 * | 10/2007 | Abi-Nassif et al. | 370/412 |
| 2004/0114602 | A1 * | 6/2004 | Ko et al. | 370/395.4 |
| 2004/0264472 | A1 * | 12/2004 | Oliver et al. | 370/395.4 |

OTHER PUBLICATIONS

Bennett, et al.; "Hierarchical Packet Fair Queueing Algorithms;" *ACM SIGCOMM*;1996; pp. 1-14.
Bennett, et al.; "WF$^2$Q: Worst Case Fair Weighted Fair Queuing"; *IEEE INFOCOM*; 1996; pp. 120-128.
Cheung, et al.; "BSFQ: Bin Sort Fair Queuing"; *IEEE INFOCOM*; 2002; pp. 1640-1649.
Demers, et al.; "Analysis and Simulation of a Fair Queuing Algorithm"; *ACM SIGCOMM*; 1989; pp. 1-12.
S. Jamaloddin Golestani; "A Self-clocked Fair Queueing Scheme for Broad-band Applications"; *IEEE INFOCOM*; 1994; pp. 636-646.
Guo Chuanxiong; "SRR, an O(1) Time Complexity Packet Scheduler for Flows in Multi-Service Packet Networks"; *ACM SIGCOMM*; 2001; pp. 211-222.
Lenzini, et al.; "Aliquem: a Novel DRR Implementation to Achieve Better Latency and Fairness at O(1) Complexity"; *IWQoS*; 2002; pp. 77-86.
Massoulié, et al.; "Bandwidth Sharing: Objectives and Algorithms"; *IEEE/ACM Trans on Networking*; vol. 10; No. 3; 2002; pp. 320-328.

(Continued)

*Primary Examiner*—Robert W Wilson
(74) *Attorney, Agent, or Firm*—Ballard Spahr LLP

(57) ABSTRACT

A scheduler for use in a computer network system which provides an order 1 level of complexity, while maintaining proportional fairness and a constant normalized worst-case fair index to create short term and long-term fairness among backlogged flows. The scheduler utilizes an intra-class scheduling algorithm to obtain the benefits of a round robin scheduler and an inter-class scheduling algorithm to obtain the benefits of timestamp based scheduler.

13 Claims, 5 Drawing Sheets

OTHER PUBLICATIONS

"The Network Simulator—ns-2"; website: http://www.isi.edu/nsnam/ns, Aug. 23, 2006 pp. 1-2.

Parekh, et al.; "A Generalized Processor Sharing Approach to Flow Control in Integrated Services Networks: the Single Node Case"; *IEEE/ACM Trans on Networking*; vol. 1; No. 3; 1993; pp. 344-357.

Ramabhadran, et al.; "Stratified Round Robin: A Low Complexity Packet Scheduler with Bandwidth Fairness and Bounded Delay"; *ACM SIGCOMM*; 2003; pp. 239-249.

Rexford, et al.; "Hardware-Efficient Fair Queueing Architectures for High-Speed Networks"; *IEEE INFOCOM*; 1996; pp. 1-11.

Rexford, et al.; "A Scalable Architecture for Fair Leaky-Bucket Shaping"; *INFOCOM*; 1997; pp. 1056-1064.

Shreedhar, et al.; "Efficient Fair Queuing using Deficit Round Robin"; *IEEE/ACM Transactions on Networking*; vol. 4, No. 3, Jun. 1996; pp. 375-385.

Stiliadis, et al.; "Design and Analysis of Frame-based Fair Queueing: A New Traffic Scheduling Algorithm for Packet-Switched Networks"; *ACM SIGMETRICS*; 1996; pp. 1-12.

Suri, et al.; "Leap Forward Virtual Clock: An $O(loglog\ N)$ Queuing Scheme with Guaranteed Delays and Throughput Fairness"; *IEEE INFOCOM*; 1997; pp. 1-21.

Xu, et al.; "On Fundamental Tradeoffs between Delay Bounds and Computational Complexity in Packet Scheduling Algorithms"; *ACM SIGCOMM*; 2002; pp. 279-292.

Yuan et al.; "FRR: a Proportional and Worst-Case Fair Round Robin Scheduler"; *Technical Report, Department of Computer Science, Florida State University*; 2004;pp. 1-13; http://www.cs.fsu.edu/~xyuan/frrtr.pdf.

Lixia Zhang; "Virtual Clock: A New Traffic Control Scheme for Packet Switching Networks"; *ACM SIGCOMM*; 1990; pp. 19-29.

\* cited by examiner

FAIR ROUND ROBIN SCHEDULER FOR NETWORK SYSTEMS

CROSS-REFERENCE TO RELATED APPLICATIONS

This application claims priority to, and incorporates by reference, U.S. Application No. 60/533,492 entitled "FRR: An O(1) Complexity Scheduler That Is Proportional and Worst-Case Fair" filed on Dec. 31, 2003.

BACKGROUND OF THE INVENTION

1. Field of the Invention

The present invention relates to data packet scheduling. The present invention provides a method, system and computer program that not only provides proportional fairness in scheduling, but also provides a constant normalized worst-case fair index to maintain short term and long-term fairness when scheduling data packets.

2. Description of the Related Art

When conducting data communications over a network, for example, the Internet, a router is utilized to route data to a given destination on the Internet. A router is a device, or in some cases, software in a computer, that determines the next destination on the network for a data packet (a unit of data that is routed between an origin and a destination on the Internet or any other packet-switched network). The router may be connected to at least two networks and may decide which way to send each data packet based on its current understanding of the state of the networks. Because data communications occur using a finite bandwidth, a router must schedule the output of data packets from the router to the connected networks.

A packet scheduler determines the order of data packets to be served (transmitted) by the router, and thus, the bandwidth allocation for each flow (data transmitted on one or more data lines, such as between computers or devices or between nodes in a network). Packet scheduling has been extensively studied in the last decade due to its importance in providing quality of service (QoS) guarantees in data networks. QoS entails ensuring that a data packet is scheduled to be output by the router within a certain time period after it is received. When scheduling a data packet, an ideal packet scheduler should have the following three properties. First, the packet scheduler should have a low complexity, preferably having a complexity of order 1 (O(1)). Having a complexity of O(1) allows the packet scheduler to be used in high-speed networks because the complexity does not depend on the number of flows in the system. Second, the packet scheduler should incur a bounded delay for each packet which reaches the head of a scheduling queue for a flow in order for the packet scheduler to provide QoS. Lastly, the packet scheduler should provide fairness among the flows (data transmitted on one or more data lines) competing for a shared link of the router to ensure that each flow receives a fair share of the bandwidth for outputting data packets.

Two fairness criteria for scheduling data packets are worst-case fairness and proportional fairness. Worst-case fairness requires the flow rates of all flows in the system to be maintained within a small error margin. Therefore, a packet scheduler, s, may provide a worst-case fairness for a flow $f_i$, if the delay of a data packet arriving at time t on flow $f_i$ is bounded by the equation $$\frac{Q_{i,s}(t)}{r_i} + C_{i,s},$$

where $Q_{i,s}(t)$ is the queue size of $f_i$ at time t, $r_i$ is the assured rate of $f_i$, and $C_{i,s}$ is a constant independent of the queues of other flows.

A packet scheduler is worst-case fair if it is worst-case fair to all flows in the system. If a packet scheduler, s, is worst-case fair, the fairness of the packet scheduler is measured by a normalized worst-case fair index. The normalized worst-case fair index for the scheduler, $c_s$, is defined as $$c_s = \max_i \left\{ \frac{r_i C_{i,s}}{R} \right\}$$

where R is the total link bandwidth for the router.

Proportional fairness requires that data bandwidths be allocated by the router to any two backlogged flows which are proportional to their weights (assured rates) at all times within a small error margin. To achieve both long term and short-term fairness, a packet scheduler should provide both worst-case fairness and proportional fairness. Existing scheduling algorithms can be classified into two types, a timestamp based algorithm and a round robin algorithm. Timestamp based algorithms have good bounded delay and fairness properties, but have a relatively high complexity, O(log N), where N is the number of flows in the system. Thus, the implementation of timestamp-based algorithms in high-speed networks is problematic due to the logarithmic complexity of the timestamp-based algorithm. Round robin algorithms have a relatively low, or order 1 complexity, but in general do not have good bounded delay and fairness properties. For example, existing round robin schemes fail to achieve a constant normalized worst-case fair index.

Round robin schedulers serve backlogged flows for data packets in a round robin fashion and have an O(1) per packet processing complexity. To achieve fairness with different packet sizes, a Deficit Round Robin (DRR) scheme augments the traditional round robin algorithm. The DRR uses a deficit counter and a quantum, or expected amount of data to be sent in one round, for each flow in addition to the standard round robin algorithm.

A number of methods have recently been proposed to improve delay and burstiness (a specific amount of data sent or received in one intermittent operation) properties of the DRR algorithm. A Smoothed Round Robin (SRR) approach improves the delay and burstiness properties by spreading the data of a flow to be transmitted in a round of data transmission over the entire round using a weight spread sequence to order packets. An Aliquem approach allows the quantum of a flow to be scaled down by making the quantum smaller that a maximum packet size, which results in better delay and burstiness properties. Both the SRR approach and the Aliquem approach improve the average data packet delay over the DRR algorithm. However, the worst-case single packet delay is proportional to the number of flows in the system. Like the SRR approach, a Stratified Round Robin approach also tries to spread the data of a flow by using a deadline based scheduling scheme to ensure that all flows receive fair access to the router from the packet scheduler. The Stratified Round Robin has a single packet delay which is related to a definite rate of the flow and is independent of the number of flows in the system.

A Bin Sort Fair Queuing (BSFQ) approach uses an approximate bin sort mechanism to schedule packets. When implementing the BFSQ approach, the worst-case single packet delay is proportional to the number of flows in the system. Hybrid round robin scheduling approaches have also been proposed. In a hybrid approach, the scheduling tasks are separated into two levels. Despite the myriad of round robin schemes, none of existing round robin approaches has a constant normalized worst-case fair index.

Accordingly, there is a need and desire for a packet scheduler that provides an O(1) complexity while maintaining proportional fairness and a normalized worst-case fair index.

SUMMARY OF THE INVENTION

The present invention provides a packet scheduler that provides an order one complexity, while maintaining proportional fairness and a normalized worst-case fair index. This fair round-robin (FRR) scheduler provides short term and long-term fairness for backlogged flows, by combining the benefits achieved using timestamp based approaches with the benefits acquired using round-robin approaches. The packet scheduler maintains an O(1) per packet scheduling complexity in that the complexity is independent of the number of flows in the system. The packet scheduler has the desired properties of an ideal packet scheduler, i.e., an O(1) per packet processing complexity, a strict rate-proportional, delay bound; and proportional and worst-case fairness for flows that are continuously backlogged.

The packet scheduler groups flows with similar weights into classes and uses a variation of the DRR approach to schedule packets within each class. The packet scheduler subsequently isolates classes using a timestamp-based scheduler to ensure that flows in different classes do not significantly affect each other. Thus, the packet scheduler of the present invention schedules packets in two levels using a timestamp based interclass scheduling technique and a modified deficit round-robin scheduling technique.

BRIEF DESCRIPTION OF THE DRAWINGS

The foregoing and other advantages and features of the invention will become more apparent from the detailed description of exemplary embodiments of the invention given below with reference to the accompanying drawings.

DETAILED DESCRIPTION OF THE INVENTION

In the following detailed description, reference is made to the accompanying drawings, which form a part hereof, and which is shown by way of illustration of specific embodiments in which the invention may be practiced. These embodiments are described in sufficient detail to enable those skilled in the art to practice the invention, and it is to be understood that other embodiments may be utilized, and that structural, logical and programming changes may be made without departing from the spirit and scope of the present invention.

Naming Conventions

The symbol N refers to a number of flows in a system.

The symbol n refers to a number of classes in a system.

The symbol R refers to a total link bandwidth for a router output.

The symbol $r_i$ refers to an assured bandwidth for a flow $f_i$.

The equation $$w_i = \frac{r_i}{R}$$

refers to a normalized weight associated with the flow $f_i$.

The symbol $L_M$ refers to a maximum data packet size.

The symbol $S_{i,s}(t1, t2)$ refers to an amount of work received by session i during time $(t_1, t_2)$ under the s server, which is the amount of data serviced (transmitted) under schedulers.

The symbol $S_{i,s}(t)$ refers to an amount of work received by session i during time (0, t) under the s server.

The symbol $F^k_{i,s}$ refers to a departure time of the $k^{th}$ packet of flow $f_i$ under the s server.

The symbol $F^p_s$ refers to a departure time of packet p under the s server.

The symbol $Q_{i,s}(t)$ refers to a queue size for flow $f_i$ at time t under the s server.

The symbol $p^k_i$ the kth packet of flow $f_i$.

Description of the System

Figure 1:
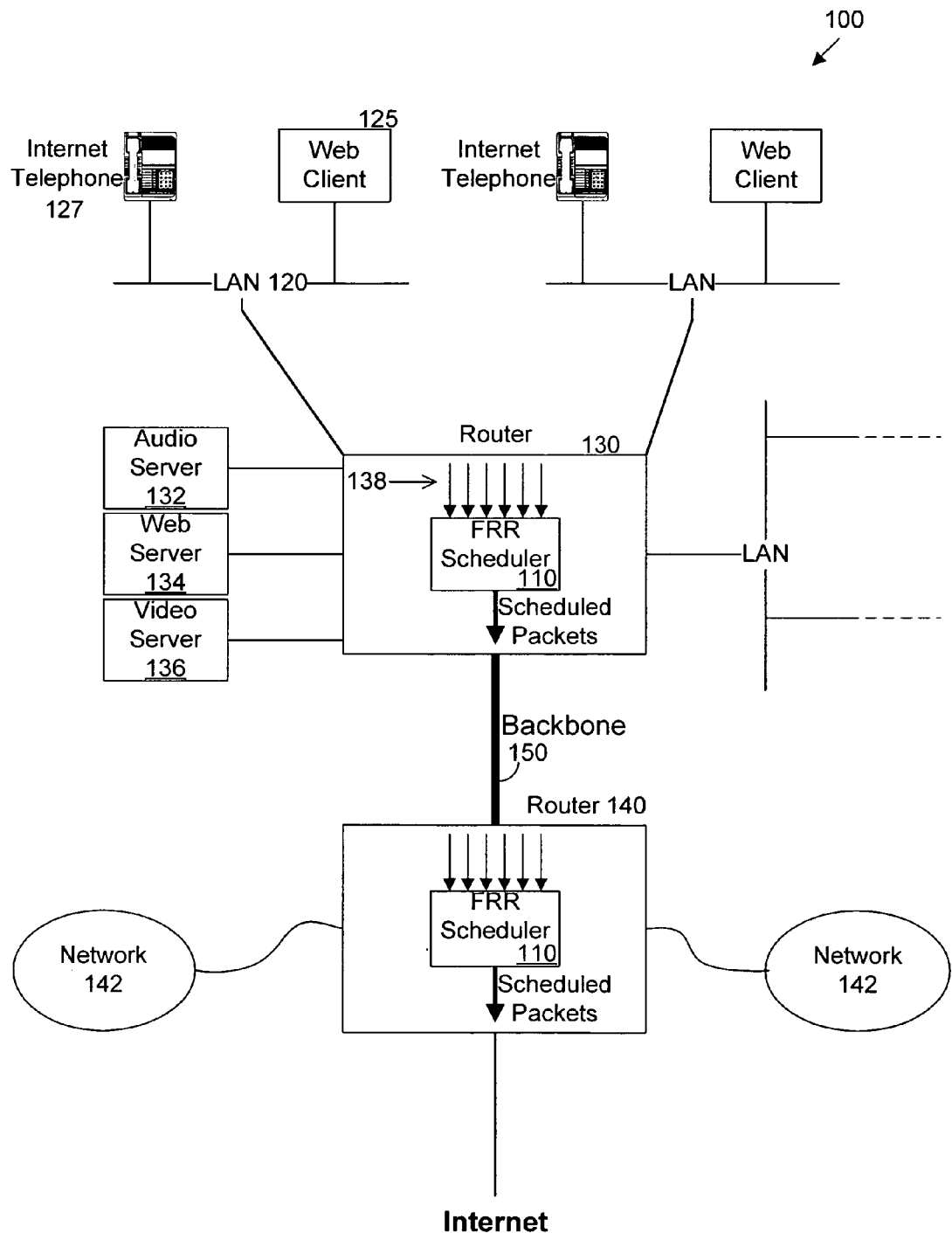
FIG. 1 is a system for implementing a packet, or round-robin scheduler, according to the present invention.

Turning now to FIG. 1, this figure is a block diagram illustrating a system 100 for implementing a fair round robin (FRR) scheduler 110, or data packet scheduler, according to the present invention. The system 100 may include a local area network (i.e., LAN), such as LAN 120 that has a web client 125 and an Internet telephone 127. This web client and Internet telephone may be any type of conventional devices, such as programs running on computers or hand-held devices.

The system 100 may also include a router 130 that functions as an edge router and houses one FRR scheduler 110. The edge router 130 may be any type of conventional edge router, such as a CISCO router 1900 and a CISCO 12000 router. As an edge router 130, this router can connect numerous LANs as well as an audio server 132, web server, 134, or video server 136. These various servers may also be any type of conventional servers, such as the Apache server on Linux. In an alternative implementation of the invention, the edge router 130 may also connect other types of devices, such as a data center or a database server.

Because the edge router 130 may connect numerous devices, it may constantly receive information, in the form of data packets, from any of the sources, such as audio server 132, LAN 120, or video server 136. This information may be received through any of this router's input data paths, or flows, which are denoted by lines 138. The FRR scheduler 110 receives these data packets from the individual flows. After processing the received data packets from the flows, the FRR scheduler 110 produces ordered blocks of data packets, or frames, which indicate the packet processing order that best utilizes system constraints. For example, the FRR scheduler 110 may produce scheduled packets that optimally utilize the bandwidth of the output port for a router 130. This bandwidth may also be referred to as the total link bandwidth.

The edge router 130 may connect to a core router 140 using a backbone 150. The backbone 150 may be any type of conventional backbone, such as Gigabit Ethernet or a SONET. One skilled in the art will appreciate that edge router 130 differs from core router 140 because of the speed of the output part, or link. Like the edge router 130, the core router 140 includes a FRR scheduler 110. Hence, the novel FRR schedule is applicable both to implementations associated with the edge router 130 and the core router 140. Moreover, the FRR scheduler 110 may also be used with software routers, wireless routers, and routers for mobile and ad hoc networks. In an alternative embodiment, the system 100 may not include another router or network.

Description of the System's Processes

Figure 2:
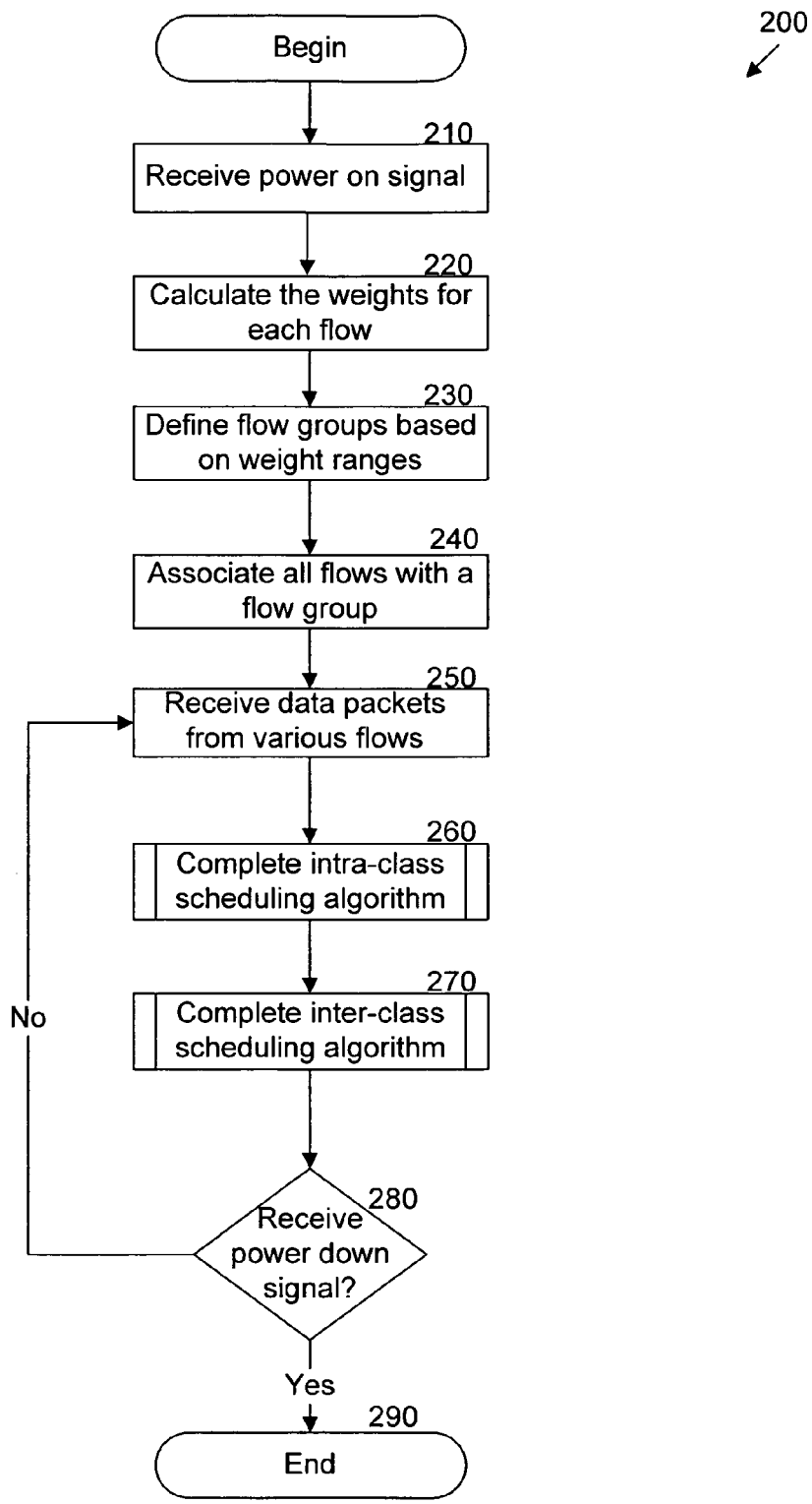
FIG. 2 is a flow chart illustrating the scheduling algorithm that controls the operation of the fair round robin scheduler of FIG. 1.

Turning now to FIG. 2, this figure is a flow chart illustrating a scheduling algorithm 200 that controls the operation of the FRR scheduler 110. One skilled in the art will appreciate that the FRR scheduler 110 may be implemented in software, hardware, or some combination thereof, such as firmware. Using the scheduling algorithm 200, the FRR scheduler 110 may effectively schedule packets in a manner that optimally utilizes the output bandwidth in a manner that produces both worst-case fairness and proportional fairness. To determine these, the FRR scheduler 110 utilizes both an intra-class scheduler for determining the order of data packets within each class and the weight of the class, and an inter-class scheduler for determining the class of the data packets.

The scheduling algorithm 200 begins at step 210 where it receives a power-on signal, which is generally associated with simply powering the FRR scheduler 110 the device. Step 210 is followed by step 220. In step 220, the scheduling algorithm 200 calculates the weights for each flow from their assured rates. As mentioned above, routers may have numerous input data paths, or flows. Generally, there is a data flow or bandwidth, rate associated with each data path, which describes the amount of data that may be carried from one point in the data path to another in a given time period. This rate is commonly referred to as the assured rate $r_i$ since the system 100 essentially assures that data will be sent at that rate. In calculating the weight for each flow, the scheduling algorithm 200 utilizes the above-mentioned formula $$w_i = \frac{r_i}{R},$$

where R is the link bandwidth of the router's output port.

Step 220 is followed by step 230. In this step, the scheduling algorithm 200 defines flow groups based on associated weight ranges. In other words, the FRR scheduler 110 groups flows into a number of classes, each class containing flows having similar weights which are determined by a user or any other administrative entity.

For a class $F_k$ (where k>or equal to 1) is defined as $$F_k = \left\{ f_i : \frac{1}{C^k} \leq w_i < \frac{1}{C^{k-1}} \right\}$$

where C is a constant. The symbol r is designated as the smallest unit of bandwidth that can be allocated to a flow. The number of classes is $$n = \left\lceil \log_C \left( \frac{R}{r} \right) \right\rceil$$

For example, when R=1 Tbps, r=1 kbps, and C=8, $$n = |\log_8(10^9)| = 10$$

Thus, only 10 classes are used for this case. For example, when C=2, $$n = |\log_2(10^9)| = 30$$

Thus, it can be assumed that the number of classes to be maintained is small in practical cases. Analyzing the equation for the number of classes, n, illustrates that it does not depend on N, the number of flows in the system, but does depend on the link bandwidth R and the assured bandwidth $r_i$.

In formula for n above, C is a constant associated with the quality of service (QoS) properties and complexity of the FRR scheduler 110. One skilled in the art will appreciate that QoS properties generally refers to how effectively a scheduler meets desired constraints, such as packet delay, worst case fairness, and proportional fairness. Because the constant C is related to each of these properties, the FRR scheduler 110 may be tuned to achieve the desired balance among the properties. For example, the formula $c_1=2C+n-1$ enables a packet p to depart before time $$t + c_1 * \frac{L_M}{r_i}.$$

Like packet delay, the worst case fairness is a function of the constant C. For example, the worst case fairness index is $$\max_i \left\{ \frac{r_i * d \frac{L_M}{r_i}}{R} \right\} = d \frac{L_M}{R}, d = 7C + n - 1.$$

Finally, the proportional fairness is also a function of the constant C. For example, the proportional fairness may be $$\left| \frac{S_{iFRR}(t_1, t_2)}{r_i} - \frac{S_{iFRR}(t_1, t_2)}{r_j} \right| \leq \frac{c_1 L_M}{r_i} + \frac{c_2 L_M}{r_j}$$

where $c_1$ and $c_2$ are functions of the constant C. Though not shown, constant C may also be used to tune the FRR scheduler 110 to achieve a desired cost described by the function $$O\left(\log_C \frac{R}{r}\right).$$

For example, the constant C may be inversely proportional to cost such that a larger constant C may produce a smaller cost. One skilled in the art will appreciate that the relationship between cost and the constant C may be linear, logarithmic, or the like.

Returning to FIG. 2, step 230 is followed by step 240. In step 240, the scheduling algorithm 200 associates each flow with a flow group that was defined in step 230. Step 240 is followed by step 250. In this step, the scheduling algorithm 200 receives data packets from the various flows. This information may be received essentially simultaneously, sequentially, or some combination thereof. Step 250 is followed by step 260. In step 260, the scheduling algorithm 200 completes the intra-class scheduling algorithm, which is described with reference to FIG. 3. Step 260 is followed by step 270 in which the scheduling algorithm 200 completes the inter-class scheduling algorithm. This algorithm is described with reference to FIG. 4. Step 270 is followed by step 280. In this step, the scheduling algorithm 200 determines whether it received a power down signal. If a power down signal was received, the "no" branch is followed from step 280 to step 250 and the scheduling algorithm repeats steps 250-280. Otherwise, the "no" branch is followed to the end step 290 and the scheduling algorithm 200 ends.

Intra-Class Scheduling

Figure 3:
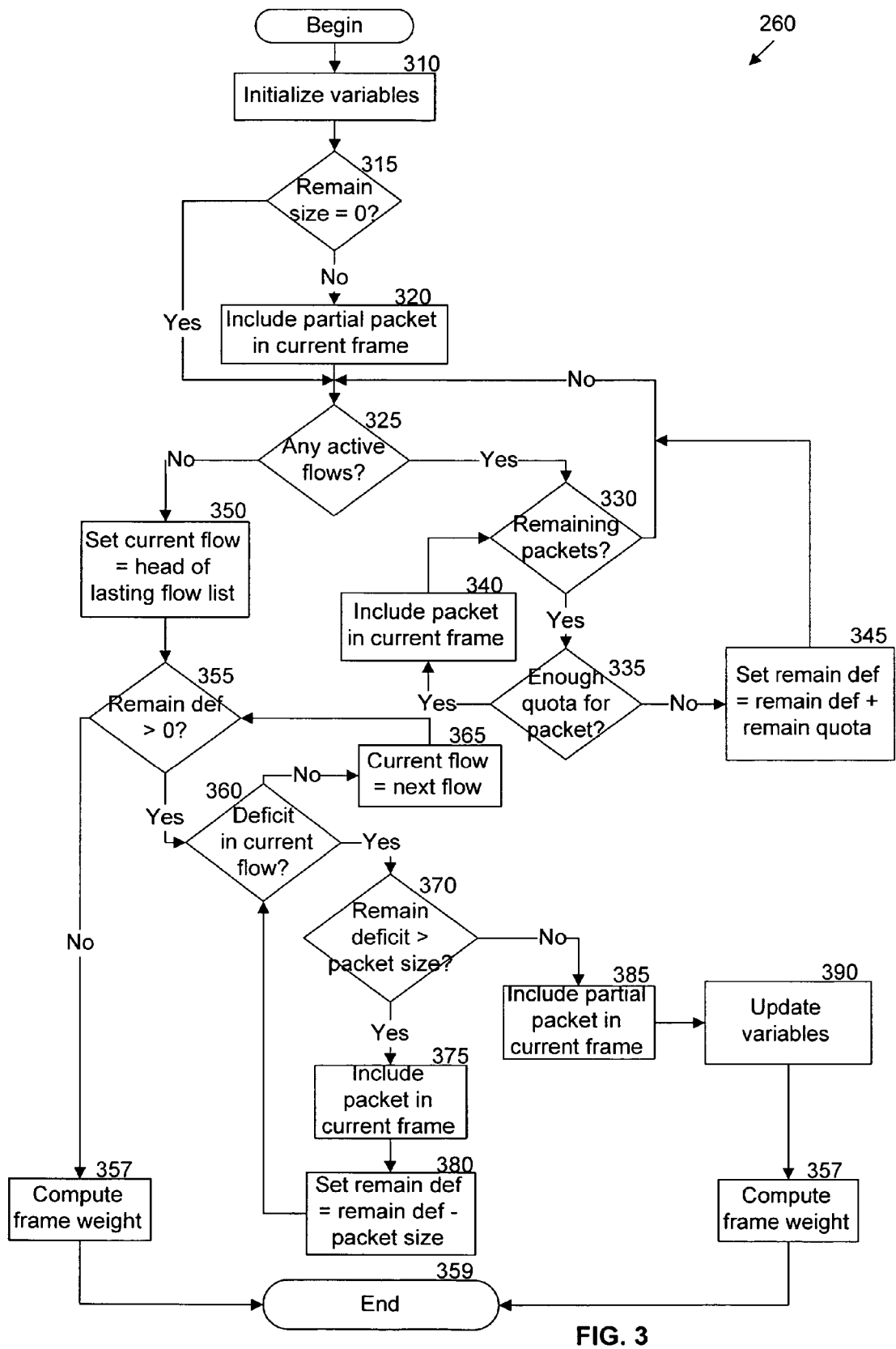
FIG. 3 is a flow chart illustrating the intra-class scheduling algorithm of FIG. 2.

Turning now to FIG. 3, this figure is a flow chart illustrating the intra-class scheduling algorithm 260 of FIG. 2. Generally, this algorithm determines (1) the weights used to send packets in a class and (2) the order of packets coming from different flows. However, inter-class scheduling algorithm 270 generally determines when a packet is serviced, or processed. The logic of the intra-class scheduling algorithm 260 is described with reference to FIG. 3, while a detailed description of this algorithm is described with reference to the included frame algorithm below. One skilled in the art will appreciate that a frame is a collection of ordered data packets and that data packets in a frame are scheduled with the same frame weight.

The intra-class scheduling algorithm 260 begins at step 310 by initializing the variables subsequently utilized, such as a remainder deficit, frame size, and a lasting flow list. If a quantum is the largest amount of data that can be transmitted along an individual flow and the flow remainder deficit is the difference between the quanta, for that flow, and the number of bits currently utilized when another packet awaits scheduling. The remainder deficit is the sum of all deficits for all of the flows. The frame size is the amount of data being transmitted along the flow and is ideally equal to the quantum. Finally, the lasting flow is a list of flows that have packets remaining to be scheduled after scheduling has occurred. The initialize step corresponds to lines 1 and 2 of the frame algorithm below. One skilled in the art will appreciate that this frame algorithm is just one part of the intra-class scheduling algorithm 260.

Step 310 is followed by step 315. In this step, the intra-class scheduling algorithm 260 determines whether the remain size is zero. The remain size is the number of bits that does not fit in the current frame because of the limited quantum size such that these bits are included in the next frame. If the remain size is zero, this means that the current frame was able to fully accommodate the last packet without needing to transfer remaining bits to the next frame. Step 310 corresponds to line 5 in the frame algorithm. When the remain size is not zero and there are bits in the subsequent frame, the "no" branch is followed from step 315 to step 320.

In step 320, the intra-class scheduling algorithm 260 includes the partial packet in the current frame. This step ensures that the frame is filled to capacity and corresponds to line 4 in the frame algorithm. Step 320 is followed by step 325. If the remain size is zero in step 315, the "yes" branch is followed from step 315 to step 325. In step 325, the intra-class scheduling algorithm 260 determines whether there are any active flows, which are flows with backlogged packets. In other words, the scheduling routine 260 determines whether any flows still have packets, which corresponds to line 5 in the frame algorithm.

When there are active flows, the "yes" branch is followed from step 325 to step 330. In this step, the intra-class scheduling algorithm 260 determines if there are any packets remaining that still need to be scheduled. This corresponds to lines 7 and 8 in the frame algorithm. If there are no remaining packets, the "no" branch is followed from step 330 back to step 325. Otherwise, the "yes" branch is followed from step 330 to step 335. In step 335, the intra-class scheduling algorithm 260 determines whether there is enough in the quantum to accommodate the remaining packet. This step corresponds to lines 9 and 10 of the frame algorithm. If there is enough in the quantum, the "yes" branch is followed from step 330 to step 340. In this step, the intra-class scheduling algorithm 260 partitions the data packet and includes a portion in the current frame, which corresponds to lines 1, 12, and 13 in the frame algorithm. If there is not enough quantum, the "no" branch is followed from step 335 to step 345. In step 345, the intra-class scheduling algorithm 260 sets the remainder deficit equal to the sum of the remainder deficits and the remaining quanta, which corresponds to lines 20, 21 of the frame algorithm. Step 345 is followed by step 325.

If there are no active flows in step 325, the "no" branch is followed from step 325 to step 350. In step 350, the intra-class scheduling algorithm 260 sets the current flow equal to the head of the lasting flow list, which corresponds to line 24 in the frame algorithm. Step 350 is followed by step 355 in which the intra-class scheduling algorithm 260 determines whether the remainder deficit is greater than zero. This corresponds to line 25 in the frame algorithm. If the remainder deficit is not greater than zero, the "no" branch is followed from step 355 to step 357. In step 357, the intra-class scheduling algorithm 260 computes the weight for the frame, which corresponds to lines 43 through 49 in the frame algorithm. Step 357 is followed by the end step 359.

If the remain deficit is greater than zero, the "yes" branch is followed from step 355 to step 360. In this step, the intra-class scheduling algorithm 260 determines whether there is a deficit in the current flow, which corresponds to lines 26, 27 of the frame algorithm. If there is not a deficit in the current flow, the "no" branch is flowed from step 360 to step 365. In step 365, the intra-class scheduling algorithm 260 sets the current flow equal to the next flow, which corresponds to line 38 in the frame algorithm. Step 365 is followed by step 355.

If it is determined in step 360 that there is a deficit in the current flow, the "yes" branch is followed from step 360 to step 370. In step 370, the intra-class scheduling algorithm 260 determines whether the remainder deficit is greater than the packet size. This step corresponds to line 27 in the frame algorithm. If the remainder deficit is greater than the packet size, the "yes" branch is followed from step 370 to step 375. In step 375, the intra-class scheduling algorithm 260 includes the packet in the current frame, which corresponds to lines 28, 29, and 30 of the frame algorithm. Step 375 is followed by step 380. In this step, the intra-class scheduling algorithm 200 sets the remainder deficit equal to the difference between the remainder deficit and the packet size, which corresponds to line 31 in the frame algorithm. Step 380 is followed by step 360.

If it is determined that the remainder deficit is not greater than the packet size in step 370, the "no" branch is followed from step 370 to step 385. In step 385, the intra-class scheduling algorithm 260 partitions the original data packet and includes a partial packet in the current frame. In other words, a part of the initial packet is included in the current frame, which corresponds to lines 37, 39 of the frame algorithm. Step 385 is followed by step 390. In this step, the intra-class scheduling algorithm 260 updates variables, which involves defining the remain size as the difference between the packet size and the remainder deficit (see frame algorithm line 40). Then this step sets the remainder deficit equal to zero. Step 390 is followed by step 357. In step 357, the intra-class scheduling algorithm 260 computes the weight for the frame, which was previously described. Step 357 is followed by the end step 359. As the intra-class scheduling algorithm 260 ends, the inter-class scheduling algorithm 270 begins (see FIG. 2)

Intra-Class Scheduling: Frame Based Approach and Algorithm

The intra-class scheduling algorithm 260 uses a frame based approach. A data packet stream within a class is partitioned into logical frames with data packets in each frame being scheduled using the weight similarities. This algorithm utilizes an approach called Look Ahead Deficit Round Robin with Weight Adjustment (LDRRWA) to create frames each having a weight assigned to the frame. In an LDRRWA approach, backlogged flows (i.e., flows with data packets waiting scheduling) are served in a round robin fashion. To offset weight differences between flows in a particular class, each flow $$f_i \in F_k \left\{ f_i : \frac{1}{C^k} \le w_i < \frac{1}{C^{k-1}} \right\} \text{ is assigned a quantum of}$$

$$quantum_i = C^k w_i L_M$$

$$\text{since } \frac{1}{C^k} \le w_i < \frac{1}{C^{k-1}},$$

$$L_M \le quantum_i < C \times L_M$$

Each LDRRWA frame, together with its associated weight, may be computed using the following frame algorithm. The following variables are used in the frame algorithm with the following meanings. The variable $deficitcount_i$ refers to a deficit count for flow $f_i$, remaindeficit refers to a sum quantum not used during a DRR round, lastingflowlist refers to flows that continue into the next frame, framesize refers to the size of a frame, frameweight refers to the weight of a frame, and remainsize refers to the size of the data packet portion belonging to the current frame.

Frame Algorithm for Computing the Next Frame for Class $F_k$

```
(1) remaindeficit = framesize = 0
(2) lastingflowlist = NULL
(3) if (remainsize > 0) then
        /*The partial packet belongs to this frame */
(4)     framesize = framesize+ remainsize
(5) end if
        /* forming the DRR round */
(6) for each active flow f_i do
(7)     deficitcount_i = deficitcount_i + quantum_i
(8)     while (deficitcount_i >0) and (f_i not empty) do
(9)         pktsize = size(head(f_i))
(10)        if (pktsize < deficitcount_i) then
(11)           remove head from f_i and put it in the frame
(12)           framesize = framesize + pktsize
(13)           deficitcount_i = deficitcount_i - pktsize
(14)        else break
(15)        end if
(16)    end while
(17)    if (f_i is empty) then
(18)        deficitcount_i = 0
(19)    else
(20)        remaindeficit = remaindeficit+ deficitcount_i
(21)        insert f_i to lastingflowlist
(22)    end if
(23) end for
/* lookahead operation */
(24) f_i = head(lastingflowlist)
(25) while (f_i ≠ NULL) and (remaindeficit > 0) do
(26)    pktsize = size(head(f_i))
(27)    if (pktsize < remaindeficit) then
(28)        remove head from f_i and put it in the frame
(29)        framesize = framesize + pktsize
(30)        remaindeficit = remaindeficit - pktsize
(31)        deficitcount_i = deficitcount_i - pktsize
(32)    else break
(33)    end if
(34)    f_i = nextflow(f_i)
(35) end while
(36) if (f_i ≠ NULL) then
(37)    pktsize = size(head(f_i))
(38)    remove head from f_i and put it in the frame
(39)    framesize = framesize + remaindeficit
(40)    remainsize = pktsize - remaindeficit
(41)    deficitcount_i = deficitcount_i - pktsize
(42) end if
/* computing the weight */
(43) weight = totalquantum = 0
(44) for each active flow f_i in current frame do
(45)    weight = weight + w_i
(46)    totalquantum = totalquantum + quantum_i
(47) end for
```

$$(48) \; frameweight = weight * \frac{framesize}{totalquantum}$$

$$(49) \; \text{if } \left( frameweight < \frac{1}{C^k} \right) frameweight = \frac{1}{C^k}$$

In the initialization phase of the frame algorithm, line (1) to line (5), variables are initialized and remainsize is added to framesize, which effectively includes a partial data packet in the frame to be computed. After the initialization, there are three main components in the frame algorithm: (1) forming a DRR round, (2) a lookahead operation, and (3) a weight calculation. In the first component, line (6) to line (23), the frame algorithm puts all data packets in the current round that have not been served into the current frame. In the second component, line (24) to line (42), the frame algorithm performs the lookahead operation by moving some packets in the next round into the current frame so that remaindeficit=0 at the frame boundary. This is done by allowing some flows to borrow credits (using quanta from a subsequent round) from the next DRR round.

Since remaindeficit=0, no credit is passed from one frame to the next frame for the class that aggregates many flows because each frame uses only the quantum allocated to that particular frame. Therefore, the passing of credits between frames may not occur. Each backlogged flow can contribute at most one data packet in the lookahead operation. A class as a whole does not pass credits between frames; however, for an individual flow, credits may be passed from one frame to the next. As a result, the $deficitcount_i$ variable may have a negative or positive value at frame boundaries. The last component in the frame algorithm, line (43) to line (49), calculates the weight for the frame.

The weights of each frame may be assigned such that (1) the weight for the frame is always less than or equal to the sum of all weights of the active flows in the frame and (2) the service time for each frame for class $F_k$ is at most $$\frac{C^k L_M}{R}.$$

Notice that $$\frac{C^k L_M}{R} = \frac{C^k * w_i * L_M}{w_i * R} = \frac{quantum_i}{r_i} \cdot \frac{C^k L_M}{R}$$

is the "standard" time for a flow in $F_k$ to send its quantum. The complexity of the algorithm is O(M), where M is the number of packets in a frame. Hence, the amortized per packet complexity for frame construction is O(1).

The frame algorithm is invoked in two occasions: (1) when the class becomes backlogged (when a packet arrives at an idle class), and (2) when the current frame is finished under the simulated GPS algorithm, which is described with reference to FIG. 4. To invoke the frame algorithm at the time when the current frame is finished using the simulated GPS algorithm, a timer, which may be implemented using a hardware interrupt or software signal, is associated with each class. Each timer records the estimated GPS finishing time of the current frame. Every time a frame departs or arrives under the estimated GPS finishing time, the timers 150 for all classes are updated to reflect a change in the progress of the GPS and weight changes. When the timer 150 expires, the corresponding frame is finished under GPS and the frame algorithm is invoked to compute a new frame. Thus, the timers are maintained at an O(n)=O(1) per frame overhead because the timers operate independent of N.

Similar to the DRR approach, the variable deficitcount$_i$ used by the FRR scheduler 110 is associated with flow$_i$ to maintain credits that are to be used during the next DRR round and decide the amount of data to be sent in one round. After each DRR round, remaindeficit maintains the sum of the quanta not used in the current DRR round. For example, quanta may not be used because the size of the next backlogged packet is larger than the remaining quanta for a flow. Instead of passing these unused quanta to the next DRR round, the LDRRWA used in FRR scheduler 110, in addition to passing the unused quanta to the next round, places some packets that would be sent in the next round in the current LDRRWA frame so that remaindeficit is equal to 0 at the frame boundaries. Thus, the LDRRWA employs a lookahead operation.

The lastingflowlist contains the list of flows which are backlogged at the end of the current round. Flows in lastingflowlist are candidates to supply packets for the lookahead operation. Frameweight is the weight to be used by inter-class scheduler 104 for the current frame. Variable framesize records the size of the current frame. The computation algorithm is used to compute the next frame (and thus, when to change weights for classes), although frame boundaries may not align with packet boundaries since the FRR scheduler 110 maintains remaindeficit=0 at the frame boundaries. Thus, a data packet may belong to two frames. Variable remainsize is a portion of the last data packet in the frame, which belongs to the next frame and should be counted in the framesize for the next frame. When the FRR scheduler 110 is in operation, a frame is a logical concept that affects only the progress of a simulated GPS. Thus, not aligning frame boundaries with packet boundaries does not cause problems in the actual packet scheduling by the FRR scheduler 110 since the FRR scheduler 110 allows a packet to be split and assigned to more than one frame. In addition, each portion of the packet may be assigned a different weight.

Inter-Class Scheduling: A Timestamp Based Scheme

Figure 4:
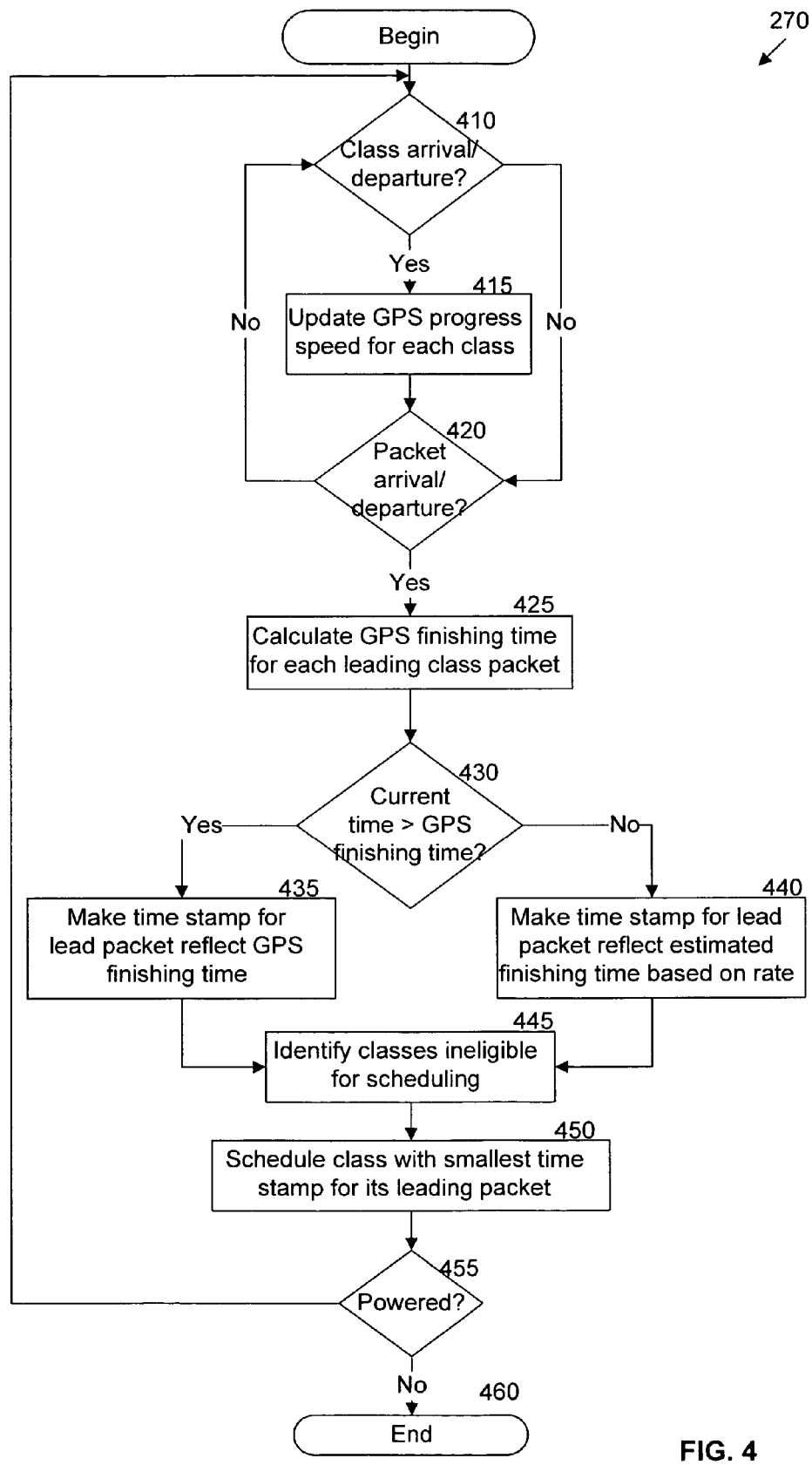
FIG. 4 is a flow chart illustrating the inter-class scheduling algorithm of FIG. 2.

Turning now to FIG. 4, this figure is a flow chart of the inter-class scheduling algorithm 270 of FIG. 2. The FRR scheduler 110 uses this algorithm to isolate classes, and serve as a timestamp based scheduler. Because multiple flows are grouped into each class, the rate allocated to a class may be changed at different times so that each flow within a class can have its fair share of router output bandwidth. Therefore, the inter-class scheduling algorithm 270 handles the dynamically changing weights of a class and achieves fair sharing of router output bandwidth, unlike a traditional GPS or timestamp based algorithm.

The inter-class scheduling algorithm begins at step 410 by determining whether a class has arrived or departed. In making this assessment, the inter-class scheduling algorithm 270 considers the behavior of both the leading the packet and the last packet. For example, if the leading packet of a class arrived, then the class arrived. If the last packet in a class departed, then the class departed. If a class did either arrive or depart, the "yes" branch is followed from step 410 to step 415. In this step, the inter-class scheduling algorithm 270 updates the GPS progress speed for each class. The formula used in completing this step is described under the mathematical explanation for inter-class scheduling.

Step 415 is followed by step 420. In this step the inter-class scheduling algorithm 270 determines whether a packet arrived or departed. When this condition does not occur, the "no" branch is followed from step 420 to step 410 and step 410 is repeated. Otherwise, the "yes" branch is followed from step 420 to step 425. In step 425, the inter-class scheduling algorithm 270 calculates the GPS finishing time for each leading class packet. The GPS finishing time is denoted as nf (i) and defined in the mathematical explanation below.

Step 425 is followed by step 430. In this step, the inter-class scheduling algorithm 270 determines whether the current time is greater than the GPS finishing time. To evaluate the current time, the inter-class scheduling algorithm 270 may use a designated timer. If the current time is greater, the "yes" branch is followed from step 430 to step 435. This is denoted as nf (i)=$F_{i,GPS}^{k}$ and described in the mathematical explanation section below. In step 435, the inter-class scheduling algorithm 270 makes the time stamp for the leading packet reflect the GPS finishing time. If the current time is not greater, the "no" branch is followed from step 430 to step 440. In step 440, inter-class scheduling algorithm 270 makes the time stamp for the leading packet reflect the estimated finishing time, which is based on the assured rate. This estimated finishing time is denoted by $$nf(i) = t_j + \frac{size_i(t_j) + S_{i,DW^2F^2Q}(t_j) - S_{i,GPS}(t_j)}{R \times w_{i,j}}$$

and described below.

Step 445 follows both step 435 and step 440. In step 445, the inter-class scheduling algorithm 270 identifies classes that are ineligible for scheduling. In making this assessment, this algorithm considers whether its scheduling time is ahead of the GPS finishing time using the condition $S_{i,GPS}(t_j) \geq S_{i,DW^2F^2Q}(t_j)$, which is more clearly described below. Step 445 is followed by step 450. In this step, the inter-class scheduling algorithm 270 schedules the class with the smallest time stamp for its leading packet. Step 450 is followed by step 455. In this step, the inter-class scheduling algorithm 270 determines whether the FRR scheduler 110 is still powered. If it is powered, the "yes" branch is followed from step 455 to step 410 and the inter-class scheduling algorithm 270 repeats. Otherwise, the "no" branch is followed from step 455 to the end step 460 and this algorithm ends. The ending of this algorithm means that the scheduling algorithm continues to step 280. (see FIG. 2)

Inter-Class Scheduling: Mathematical Explanation

The inter-class scheduling algorithm 270 employs a scheduling scheme called Dynamic Weight Worstcase Fair Weighted Fair Queuing ($DW^2F^2Q$). The $DW^2F^2Q$ scheme surpasses conventional schemes by producing comparable results when the weights do not change and closely approximating ideal GPS behavior when weights change dynamically.

Thus, the GPS progress of a class i during the time interval $[t_{j-1},t_{j-1}+\tau)$, where $0<\tau \leq t_j-t_{j-1}$, may be calculated using the following equation:

$$S_{i,GPS}(t_1)=0$$

$$S_{i,GPS}(t_{j-1}+\tau) = S_{i,GPS}(t_{j-1}) + \frac{w_{i,j-1}}{\sum k \in B_{j-1} w_{k,j-1}} \times R \times \tau$$

where $B_{j-1}$ are the backlogged flows in the period $[t_{j-1},t_j]$.

The $DW^2F^2Q$ keeps track of the GPS progress for all the classes using the above formula. Thus, the computational complexity using the $DW^2F^2Q$ is $O(n)=O(1)$.

In addition to keeping track of GPS progress, $DW^2F^2Q$ also records the amount of data for each class that has been serviced. For example, assume that a server has to decide the next data packet at time $t_j$, where $size_i(t_j)$ is the size of the data packet at the head of class i at time $t_j$, where $S_{i,GPS}(t_j)$ is the amount of data transmitted in session i served under GPS, and where $S_{i,DW^2F^2Q}(t_j)$ is the amount of data in session i actually served under $DW^2F^2Q$. The head of class i may be scheduled at $t_j$ if the following two conditions are met:

Condition 1): $S_{i,GPS}(t_j) \geq S_{i,DW^2F^2Q}(t_j)$
Condition 2): Assign nf (i) as the estimated GPS finishing time of the head packet of class i, $p_i^k$. For a backlogged class i, nf (i) may be computed as follows:

If $size_i(t_j)+S_{i,DW^2F^2Q}(t_j)>S_{i,GPS}(t_j)$, $$nf(i) = t_j + \frac{size_i(t_j) + S_{i,DW^2F^2Q}(t_j) - S_{i,GPS}(t_j)}{R \times w_{i,j}}$$

If $size_i(t_j)+S_{i,DW^2F^2Q}(t_j) \leq S_{i,GPS}(t_j)$, $$nf(i)=F_{i,GPS}^k$$

where class i has the smallest estimated GPS finishing time, nf (i), among all backlogged classes. For classes having the same nf (i), a class number may be used to break the tie.

Condition 1 ensures that $DW^2F^2Q$ does not schedule a data packet before the GPS starting time for the data packet. Thus, the $DW^2F^2Q$ will be at most one packet ahead of GPS. Condition 1 ensures that data packets are ordered based on the estimated GPS finishing time. The class whose head packet has the smallest estimated GPS finishing time is scheduled first.

There are two cases for estimating the GPS finishing time. The first case is when the packet has not departed under GPS, $(size_i(t_j)+S_{i,DW^2F^2Q}(t_j)>S_{i,GPS}(t_j))$. In this case, the finishing time is estimated using the current weight, $w_{ij}$. $R \times w_{ij}$ is the GPS assured data rate for weight $w_{ij}$. In another case, the data packet has departed under GPS, $(size_i(t_j)+S_{i,DW^2F^2Q}(t_j)<S_{i,GPS}(t_j))$. In this case, the actual GPS departure time, which is the accurate GPS finishing time, is used as the timestamp. Hence, $DW^2F^2Q$ uses accurate information to schedule packets that fall behind GPS and may use inaccurate information to schedule packets that are ahead of GPS. Thus, the per-packet computational complexity of the inter-class scheduling algorithm 270 when n is the number of classes, is $O(n)=O(1)$ because n is equal to a small constant.

Illustrative Example

By way of example, the FRR scheduler 110 may operate in the following manner, when using the GPS as the inter-class scheduling algorithm 270 for a link having 4 units of bandwidth with the following settings.

C=2 and there are two classes where $$F_1 = \left\{f_1 : \frac{1}{2} \leq w_i < 1\right\} \text{ and } F_2 = \left\{f_i : \frac{1}{4} \leq w_i < \frac{1}{2}\right\}.$$

Three flows, $f_1$, $f_2$ and $f_3$, having data rates $r_1=2$ and $r_2=r_3=1$ are in the system. The associated weights for flows, $f_1$, $f_2$ and $f_3$ are $w_1=\frac{1}{2}$, $w_2=\frac{1}{4}$, and $w=\frac{1}{4}$, respectively. Thus, $f_1$ is associated with $F_1$, and $f_2$ and $f_3$ are associated with $F_2$. The quantum for each of the three flows is L, where L is the maximum data packet size. All data packets in $f_1$ are of size L, all packets in $f_2$ are of size 0.99 L and all packets in $f_3$ are of size 0.01 L. Flows $f_1$ and $f_2$ are always backlogged. Flow $f_3$ is not always backlogged, since the data packets of flow $f_3$ arrive in such a way that one packet arrives before a new frame is formed. Thus, each $F_2$ frame contains one packet from $f_3$.

Figure 5:
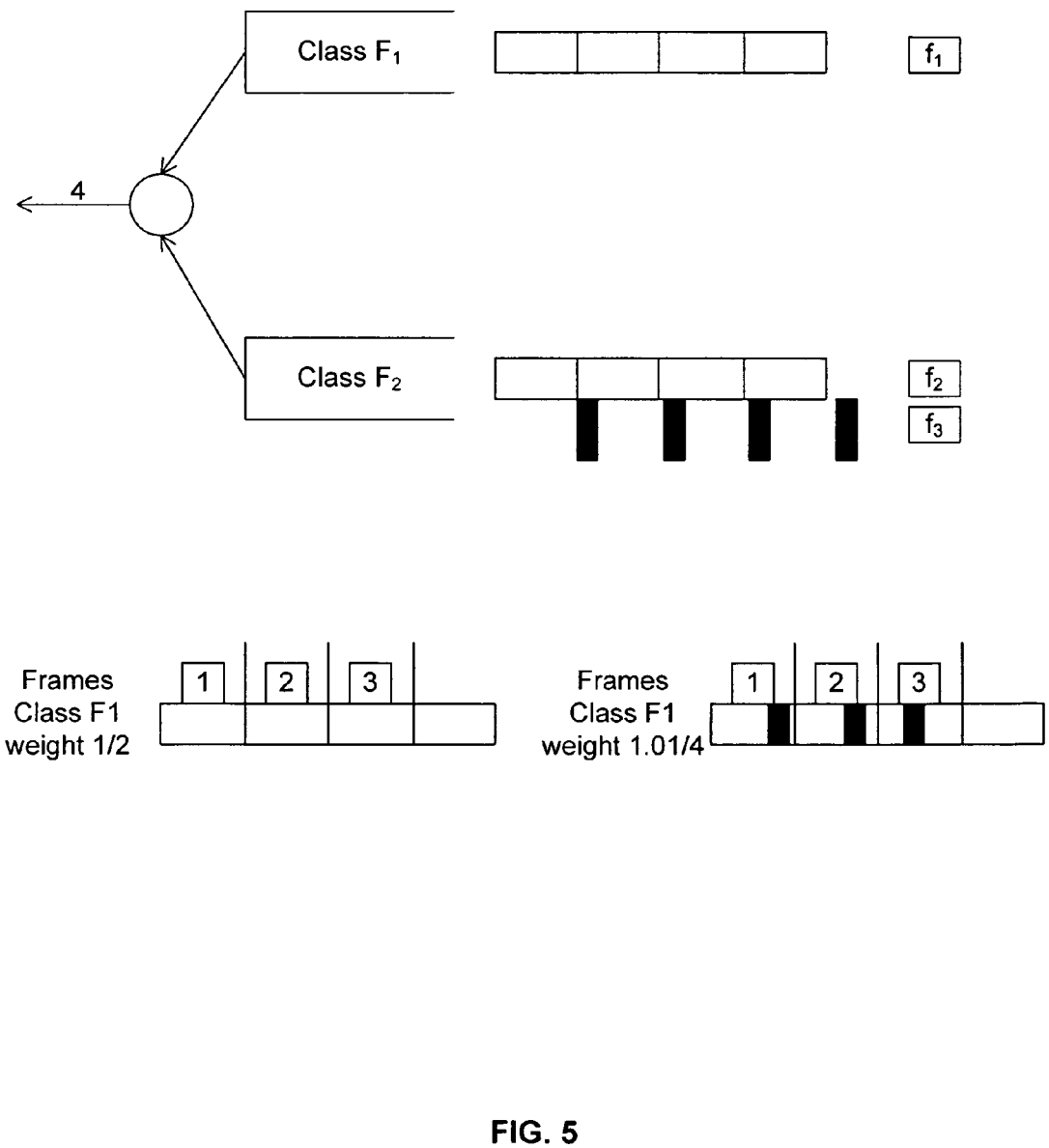
FIG. 5 is a block diagram illustrating the operation of the fair round robin scheduler of FIG. 1.

As illustrated in FIG. 5, each $F_1$ frame contains one packet from $f_1$. For $F_2$, the lookahead operation moves portion of the $f_2$ packet in the next DRR round into the current frame. Thus, the frame boundaries may not be aligned with the packet boundaries. In addition, frames from different classes may not be aligned.

In determining the worst-case and proportional fairness for flows $f_1$ and $f_2$, the weight for $F_1$, which is computed using line (48) of the frame algorithm, is $\frac{1}{2}$. The lookahead operation of the frame algorithm ensures that the size of $f_2$ data in a frame is L. Thus, the size of each $F_2$ frame is L+0.01 L=1.01 L. The weight of $F_2$ is computed using line (48) of the frame algorithm $$weight = (w_2 + w_3) * \frac{framesize}{quantum_2 + quantum_3} = \left(\frac{1}{4} + \frac{1}{4}\right) * \frac{1.01L}{2L} = \frac{1.01}{4}$$

Hence, $F_1$, (and thus $f_1$) is allocated for a bandwidth use of $$4 * \frac{\frac{1}{2}}{\frac{1}{2} + \frac{1.01}{4}} = \frac{8}{3.01} > 2.$$

$F_2$ is allocated a bandwidth use of $$4 * \frac{\frac{1.01}{4}}{\frac{1}{2} + \frac{1.01}{4}}.$$

For each $F_2$ frame of size 1.01 L, L belongs to $f_2$. Thus, the rate allocated to f2 is $$4 * \frac{\frac{1.01}{4}}{\frac{1}{2} + \frac{1.01}{4}} * \frac{L}{1.01L} = \frac{4}{3.01} > 1.$$

The data rates allocated to $f_1$ and $f_2$ are larger than their assured rates while maintaining worst-case fairness.

Furthermore, the ratio of the data rates allocated to $f_1$ and $f_2$ is equal to $$\frac{\frac{8}{3.01}}{\frac{4}{3.01}} = 2,$$

which is equal to the ratio of weights for $f_1$ and $f_2$. Thus, the proportional fairness of scheduling is also maintained.

While the invention has been described in detail in connection with exemplary embodiments, it should be understood that the invention is not limited to the above-disclosed embodiments. Rather, the invention can be modified to incorporate any number of variations, alterations, substitutions, or equivalent arrangements not heretofore described, but which are commensurate with the spirit and scope of the invention. In particular, the specific embodiments of the fair round robin scheduler described should be taken as exemplary and not limiting. Accordingly, the invention is not limited by the foregoing description or drawings, but is only limited by the scope of the appended claims.

We claim:

1. A router configured for scheduling data packets received from a plurality of data paths, comprising:
    an input port, configured for receiving data packets from each data path;
    a scheduler, configured for performing intra-class scheduling on each data path, resulting in classified data paths and performing inter-class scheduling on the classified data paths, wherein performing intra-class scheduling on each data path, resulting in classified data paths comprises,
    determining a weight ($w_i$) for each data path, wherein determining a weight for each data path comprises $$w_i = \frac{r_i}{R},$$

wherein $r_i$ is an assured rate and R is a link bandwidth,
    defining classes of data paths according to predetermined weight ranges,
    associating each data path with one of the classes of data paths,
    assigning data packets from each of the data paths to frames according to the class of data path to which each data packet belongs, and
    determining a weight (frameweight) for each frame; and
    an output port, configured for outputting the data packets according to the intra-class scheduling and the inter-class scheduling.

2. The router of claim 1, wherein determining a weight for each frame comprises assigning the weight such that the weight is less than or equal to the sum of all weights for all active data paths in the frame by using a lookahead operation.

3. The router of claim 1, wherein determining a weight for each frame comprises:

$$frameweight = totalweight * \frac{framesize}{totalquantum},$$

wherein totalweight is the sum of weights of all active data paths in a frame, framesize is the amount of data in the frame, and totalquantum is the sum of the quanta allocated for all active data paths in the frame.

4. The router of claim 1, wherein performing inter-class scheduling on the classified data paths comprises:
    receiving the classified data paths, wherein each classified data path comprises a leading data packet;
    updating a general processor scheduling (GPS) progress speed for each classified data path;
    determining a GPS finishing time for each leading data packet;
    determining whether a current time is greater than each of the determined GPS finishing times,
        wherein if the current time is greater, the leading packet is time stamped with the determined GPS finishing time,
        whereas if the current time is not greater, the leading packet is time stamped with an estimated finishing time;
    scheduling the classified data path having the smallest time stamp for its leading packet.

5. A computer memory for scheduling data packet received from a plurality of data paths, having computer executable instructions embodied thereon performing the following steps:
    receiving data packets from each data path;
    performing intra-class scheduling on each data path, resulting in classified data paths, wherein performing intra-class scheduling on each data path, resulting in classified data paths comprises,
    determining a weight ($w_i$) for each data path, wherein determining a weight for each data path comprises $$w_i = \frac{r_i}{R},$$

wherein $r_i$ is an assured rate and R is a link bandwidth,
    defining classes of data paths according to predetermined weight ranges,
    associating each data path with one of the classes of data paths,
    assigning data packets from each of the data paths to frames according to the class of data path to which each data packet belongs, and
    determining a weight (frameweight) for each frame;
    performing inter-class scheduling on the classified data paths; and
    outputting the data packets according to the intra-class scheduling and the inter-class scheduling.

6. The computer memory of claim 5, wherein determining a weight for each frame comprises assigning the weight such that the weight is less than or equal to the sum of all weights for all active data paths in the frame by using a lookahead operation.

7. The computer memory of claim 5, wherein determining a weight for each frame comprises:

$$frameweight = totalweight * \frac{framesize}{totalquantum},$$

wherein totalweight is the sum of weights of all active data paths in a frame, framesize is the amount of data in the frame, and totalquantum is the sum of the quanta allocated for all active data paths in the frame.

8. The computer memory of claim 5, wherein performing inter-class scheduling on the classified data paths comprises:
receiving the classified data paths, wherein each classified data path comprises a leading data packet;
updating a general processor scheduling (GPS) progress speed for each classified data path;
determining a GPS finishing time for each leading data packet;
determining whether a current time is greater than each of the determined GPS finishing times,
wherein if the current time is greater, the leading packet is time stamped with the determined GPS finishing time,
whereas if the current time is not greater, the leading packet is time stamped with an estimated finishing time;
scheduling the classified data path having the smallest time stamp for its leading packet.

9. A router configured for scheduling data packets received from a plurality of data paths, comprising:
an input port, configured for receiving data packets from each data path;
a scheduler, configured for performing intra-class scheduling on each data path, resulting in classified data paths and performing inter-class scheduling on the classified data paths, wherein performing inter-class scheduling on the classified data paths comprises,
receiving the classified data paths, wherein each classified data path comprises a leading data packet,
updating a general processor scheduling (GPS) progress speed for each classified data path,
determining a GPS finishing time for each leading data packet,
determining whether a current time is greater than each of the determined GPS finishing times,
wherein if the current time is greater, the leading packet is time stamped with the determined GPS finishing time,
whereas if the current time is not greater, the leading packet is time stamped with an estimated finishing time,
scheduling the classified data path having the smallest time stamp for its leading packet; and
an output port, configured for outputting the data packets according to the intra-class scheduling and the inter-class scheduling.

10. The router of claim 9, wherein performing intra-class scheduling on each data path, resulting in classified data paths comprises:
determining a weight ($w_i$) for each data path;
defining classes of data paths according to predetermined weight ranges;
associating each data path with one of the classes of data paths;
assigning data packets from each of the data paths to frames according to the class of data path to which each data packet belongs; and
determining a weight (frameweight) for each frame.

11. The router of claim 10, wherein determining a weight for each data path comprises:

$$w_i = \frac{r_i}{R},$$

wherein $r_i$ is an assured rate and R is a link bandwidth.

12. The router of claim 10, wherein determining a weight for each frame comprises assigning the weight such that the weight is less than or equal to the sum of all weights for all active data paths in the frame by using a lookahead operation.

13. The router of claim 10, wherein determining a weight for each frame comprises:

$$frameweight = totalweight * \frac{framesize}{totalquantum},$$

wherein totalweight is the sum of weights of all active data paths in a frame, framesize is the amount of data in the frame, and totalquantum is the sum of the quanta allocated for all active data paths in the frame.

* * * * *